Patented July 13, 1937

2,087,090

UNITED STATES PATENT OFFICE 2,087,090

MANUFACTURE OF SAFETY GLASS

Otto Hauffe, Eilenburg, Germany, assignor to Deutsche Celluloid-Fabrik, Eilenburg in Saxony, Germany, a corporation of Germany No Drawing. Application May 8, 1935, Serial No. 20,397. In Germany May 11, 1934

5 Claims. (Cl. 49—81)

My present invention relates to the manufacture of safety-glass.

One of its objects is an improved process for the manufacture of safety-glass. Further objects will be seen from the detailed specification following hereafter.

According to the present invention I have found that a particular good connection between the glass plates of safety-glass is obtained by using a polymerization product and applying the same in the following manner. The polymerization product is brought into the condition of a paste or emulsion by grinding it with water for instance, in a suitable grinding device. This paste is applied to the suitably prepared glass plates in any suitable manner, for instance, with a spraying pistol. As polymerization products suitable for the invention there may be used polyvinyl chloride, or mixed polymerization product of vinyl chloride and an acrylic acid ester, for instance, of the lower fatty alcohols such as the methylester, ethylester, propylester and the butylester of acrylic acid. After the paste or emulsion has been applied to the plates, the water is removed from the emulsion, the plates are placed together with the coated sides towards one another, and then they are combined with the aid of heat and pressure.

For example glass plates which have been cleansed and may have been prepared with gelatin or a similar substance, are coated with an emulsion of a mixed polymerization product. For this purpose one part by weight of a mixed polymerization product made of 80 per cent of vinyl chloride and 20 per cent of acrylic acid methyl ester is made into a paste with 2½ parts by weight of water in a suitable disintegrating device and the paste is sprayed on to the prepared glass plates with a spraying pistol by means of air under pressure. The layers on the glass plates are then dried with the assistance of heated air. Two glass plates which have been thus treated are then super-imposed with their coated sides towards one another and pressed at about 130–150° C. in a hydraulic press.

The invention permits, by spraying an aqueous paste onto the glass surface, the production of a very uniform layer of the polymerization product, such as could not be obtained by using a dry powdered polymerization product. Furthermore an essential advantage of the invention lies in the fact that no solvent is required for producing and manipulating the intermediate layer between the glass plates.

What I claim is:

1. A process of manufacturing safety-glass which comprises producing a mixture of water and a compound selected from the group consisting of polyvinylchloride, and mixed polymerization products of vinylchloride with an acrylic acid ester wherein the said compound is present in a finely subdivided condition, coating a glass plate with said mixture, drying said mixture, placing glass plates thus prepared together with the coated sides in contact, and uniting said glass plates by the application of heat and pressure.

2. A process of manufacturing safety-glass which comprises producing a mixture of water and a compound selected from the group consisting of polyvinylchloride, and mixed polymerization products of vinylchloride with an acrylic acid ester of a lower fatty alcohol wherein the said compound is present in a finely subdivided condition, coating a glass plate with said mixture, drying said mixture, placing glass plates thus prepared together with the coated sides in contact, and uniting said glass plates by the application of heat and pressure.

3. A process of manufacturing safety-glass which comprises producing a paste of water and a compound selected from the group consisting of polyvinylchloride, and mixed polymerization products of vinylchloride with an acrylic acid ester of a lower fatty alcohol wherein the said compound is present in a finely subdivided condition, coating a glass plate with said mixture, drying said mixture, placing glass plates thus prepared together with the coated sides in contact, and uniting said glass plates by the application of heat and pressure.

4. A process of manufacturing safety-glass which comprises producing an emulsion of water and a compound selected from the group consisting of polyvinylchloride, and mixed polymerization products of vinylchloride with an acrylic acid ester of a lower fatty alcohol wherein the said compound is present in a finely subdivided condition, coating a glass plate with said mixture, drying said mixture, placing glass plates thus prepared together with the coated sides in contact, and uniting said glass plates by the application of heat and pressure.

5. A process of manufacturing safety-glass which comprises producing a paste from one part by weight of a mixed polymerization product of 80% of vinylchloride and 20% of acrylic acid methyl ester, and 2½ parts by weight of water, spraying said mixture on a glass plate, drying said mixture, placing glass plates thus prepared together with their coated sides in contact, and uniting said glass plates by pressing them together at a temperature of 130 to 150° C.

OTTO HAUFFE.